(12) United States Patent
Kaita et al.

(10) Patent No.: US 9,086,142 B2
(45) Date of Patent: Jul. 21, 2015

(54) CONTROL DEVICE FOR VEHICLE

(75) Inventors: Keiji Kaita, Miyoshi (JP); Nobuyuki Tanaka, Toyota (JP); Masaya Amano, Toyota (JP); Koji Hokoi, Toyota (JP); Masashi Yoshimi, Toyota (JP); Takeshi Hoshiba, Anjo (JP); Takahiko Hirasawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/983,105

(22) PCT Filed: Feb. 4, 2011

(86) PCT No.: PCT/JP2011/052386
§ 371 (c)(1),
(2), (4) Date: Aug. 1, 2013

(87) PCT Pub. No.: WO2012/105046
PCT Pub. Date: Aug. 9, 2012

(65) Prior Publication Data
US 2013/0317715 A1    Nov. 28, 2013

(51) Int. Cl.
*G06F 7/00*    (2006.01)
*G06F 17/00*   (2006.01)
*G06F 19/00*   (2011.01)
*F16H 61/12*   (2010.01)
*F16H 61/16*   (2006.01)
*F16H 59/10*   (2006.01)

(52) U.S. Cl.
CPC ............. *F16H 61/12* (2013.01); *F16H 59/105* (2013.01); *F16H 2061/1284* (2013.01); *F16H 2061/168* (2013.01)

(58) Field of Classification Search
CPC ........................................................ F16H 61/12
USPC ............................................................ 701/63
See application file for complete search history.

(56) References Cited

U.S. PATENT DOCUMENTS

| 2006/0240945 A1* | 10/2006 | Tanaka et al. ............... 477/111 |
| 2007/0054774 A1 | 3/2007 | Tomaschko et al. |
| 2009/0038866 A1* | 2/2009 | Abe et al. .................. 180/65.7 |
| 2012/0022756 A1 | 1/2012 | Ueno et al. |

FOREIGN PATENT DOCUMENTS

| JP | 2000-296728 A | 10/2000 |
| JP | 2001-289067 A | 10/2001 |

(Continued)

*Primary Examiner* — Imran Mustafa
(74) *Attorney, Agent, or Firm* — Kenyon & Kenyon LLP

(57) ABSTRACT

An ECU determines whether or not there is an abnormality (shift pattern abnormality) in a combination of shift signals provided from a shift position sensor. After occurrence of the shift pattern abnormality is determined, the ECU determines whether or not a first condition that a shift pattern changes into a normal pattern of a drive range is satisfied, and whether or not a second condition that a vehicle is running (a driver has an intention to cause the vehicle to run) is satisfied. When occurrence of the shift pattern abnormality is determined, the ECU stops generation of driving force of the vehicle and prohibits switching to the drive range. When the above-mentioned first condition and second condition are satisfied after occurrence of the shift pattern abnormality is determined, the ECU switches the shift range to the drive range indicated by the shift pattern and recovers the driving force.

7 Claims, 10 Drawing Sheets

(56) References Cited

FOREIGN PATENT DOCUMENTS

| | | |
|---|---|---|
| JP | 2001-294056 A | 10/2001 |
| JP | 2003-065436 A | 3/2003 |
| JP | 2003-130209 A | 5/2003 |
| JP | 2004-359155 A | 12/2004 |
| JP | 2006-292022 A | 10/2006 |
| JP | 2009-248912 A | 10/2009 |
| JP | 2010-230122 A | 10/2010 |
| WO | 2010/110098 A1 | 2/2015 |

* cited by examiner

FIG.5

| | | SHIFT SIGNAL | | | | | | | |
|---|---|---|---|---|---|---|---|---|---|
| | | P | R | N | D | B | FD | RV | MJ |
| SHIFT POSITION | P | O | | | | | | | O |
| | R | | O | | | | | O | O |
| | N | | | O | | | | | O |
| | D | | | | O | | O | | O |
| | (B) | | | | | O | O | | O |

NORMAL TIME

FIG.6

| | | SHIFT SIGNAL | | | | | | | |
|---|---|---|---|---|---|---|---|---|---|
| | | P | R | N | D | B | FD | RV | MJ |
| SHIFT POSITION | P | O | | | ● | | | | O |
| | R | | O | | ● | | | O | O |
| | N | | | O | ● | | | | O |
| | D | | | | O | | O | | O |
| | (B) | | | | ● | O | O | | O |

ABNORMAL TIME (D-ON FAILURE)

CONTROL DEVICE FOR VEHICLE

CROSS REFERENCE TO RELATED APPLICATION

This is a national phase application based on the PCT International Patent Application No. PCT/JP2011/052386 filed on Feb. 4, 2011, the entire contents of which are incorporated herein by reference.

TECHNICAL FIELD

The present invention relates to control over a vehicle when an abnormality occurs in a sensor detecting the position of a shift lever.

BACKGROUND ART

There has been conventionally known a vehicle in which a shift range is switched in accordance with a result of detection by a shift position sensor detecting the position of a shift lever operated by a driver.

In regard to such a vehicle, Japanese Patent Laying-Open No. 2001-289067 (PTL 1) describes that if it can be determined that the shift range is the N (neutral) range based on the result of detection by the shift position sensor, even at the time of occurrence of an abnormality that it cannot be determined that the shift range is the P (parking) range based on the result of detection by the shift position sensor, startup of the vehicle is permitted in the N range.

CITATION LIST

Patent Literature

PTL 1: Japanese Patent Laying-Open No. 2001-289067
PTL 2: Japanese Patent Laying-Open No. 2001-294056
PTL 3: Japanese Patent Laying-Open No. 2003-65436
PTL 4: Japanese Patent Laying-Open No. 2000-296728
PTL 5: Japanese Patent Laying-Open No. 2009-248912

SUMMARY OF INVENTION

Technical Problem

In the technique disclosed in PTL 1, however, at the time of occurrence of an abnormality that it cannot be normally determined that the shift range is the N range, startup of the vehicle cannot be permitted and the vehicle cannot run in the failsafe mode even if it can be normally determined that the shift range is the D (drive) range or the R (reverse) range.

The present invention has been made to solve the above problems, and an object of the present invention is to enhance the ability of the vehicle to run in the failsafe mode when an abnormality occurs in the shift position sensor.

Solution to Problem

A control device according to the present invention controls a vehicle in which a shift range is switched in accordance with a shift signal outputted from a sensor detecting shift operation by a driver. The shift range includes a drive range for causing the vehicle to run. The control device includes: an abnormality determination unit that determines whether or not the shift signal is abnormal; and a running control unit that, when it is determined that the shift signal is abnormal, determines whether or not a predetermined condition, which includes a first condition that the shift signal changes into a state in which the shift signal normally indicates the drive range and a second condition that the driver has an intention to cause the vehicle to run, is satisfied, after it is determined that the shift signal is abnormal, and when the predetermined condition is satisfied, permits running or startup of the vehicle in the drive range indicated by the shift signal.

Preferably, when it is detected that the vehicle is running, the running control unit determines that the second condition is satisfied.

Preferably, when it is detected that the driver is in the vehicle, the running control unit determines that the second condition is satisfied.

Preferably, in addition to the first and second conditions, the predetermined condition includes a third condition that a direction in which the vehicle can run in the drive range indicated by the shift signal matches a movement direction of the vehicle.

Preferably, in addition to the first and second conditions, the predetermined condition includes a third condition that an amount of operation of an accelerator pedal by the driver is equal to or smaller than a threshold value.

Preferably, when it is determined that the shift signal is abnormal, the running control unit stops driving force of the vehicle until the predetermined condition is satisfied, and when the predetermined condition is satisfied, the running control unit sets the shift range to the drive range indicated by the shift signal and recovers the driving force of the vehicle.

Preferably, when the shift signal is normal, the running control unit causes the driving force to follow requested driving force at a first speed, and when recovering the driving force after it is determined that the shift signal is abnormal, the running control unit causes the driving force to follow the requested driving force at a second speed slower than the first speed for a certain time period.

Preferably, the control device further includes a notification unit that notifies the driver of recovery of the driving force.

Preferably, there are a plurality of the shift ranges. The sensor is configured to output a plurality of predetermined combinations of shift signals corresponding to the plurality of the shift ranges. When a combination of the shift signals does not correspond to any of the plurality of predetermined combinations, the abnormality determination unit determines that the shift signal is abnormal.

Advantageous Effects of Invention

According to the present invention, the ability of the vehicle to run in the failsafe mode when an abnormality occurs in the shift position sensor can be enhanced.

BRIEF DESCRIPTION OF DRAWINGS

FIG. 5 shows a correspondence relationship between shift position and combination of shift signals when the shift sensor is normal.
FIG. 6 shows a correspondence relationship between shift position and combination of shift signals when the shift sensor is abnormal.

DESCRIPTION OF EMBODIMENTS

First Embodiment

Figure 1:
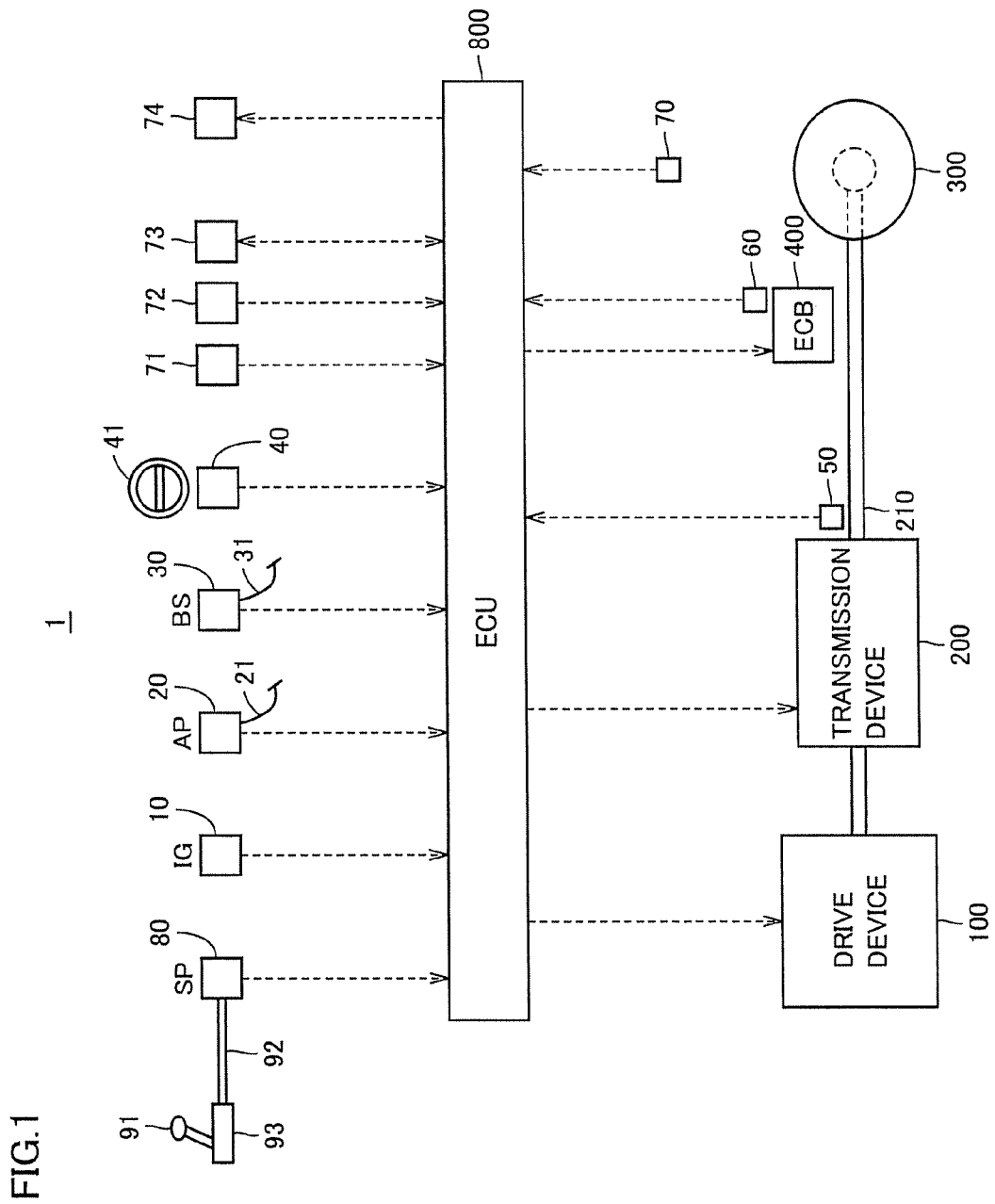
FIG. 1 is an overall block diagram of a vehicle.

Embodiments of the present invention will be described hereinafter with reference to the drawings. In the description below, the same reference characters are given to the same components. Names and functions thereof are also the same. Therefore, detailed description on them will not be repeated.

FIG. 1 is an overall block diagram of a vehicle 1 on which a control device according to the present embodiment is mounted. Vehicle 1 includes a drive device 100, a transmission device 200, a wheel 300, an ECB (Electronically Controlled Brake System) 400, and an ECU (Electronic Control Unit) 800. Vehicle 1 further includes an IG switch 10, an accelerator pedal 21, a brake pedal 31, a steering 41, and a shift lever 91, which are operated by the driver. Vehicle 1 further includes an accelerator position sensor 20, a brake stroke sensor 30, a steering angle sensor 40, a vehicle speed sensor 50, a hydraulic pressure sensor 60, an acceleration sensor 70, a seat load sensor 71, a monitoring camera 72, a sound recognition device 73, a notification device 74, and a shift sensor 80.

Drive device 100, transmission device 200 and ECB 400 are controlled in accordance with control signals provided from ECU 800.

Drive device 100 is a device generating driving force of vehicle 1. Drive device 100 is typically constituted by an engine, a motor and the like.

Transmission device 200 is provided between drive device 100 and wheel 300, for changing the rotation speed of drive device 100 and transmitting the rotation speed to wheel 300. Transmission device 200 includes a plurality of friction engagement elements (clutch and brake) for switching the power transmission direction and the gear ratio, and a parking gear for fixing an output shaft 210 of transmission device 200. In accordance with the control signals provided from ECU 800, the control state of transmission device 200 (hereinafter also referred to as "shift range") is switched to the P (parking) range, the R (reverse) range, the N (neutral) range, the D (drive) range, or the B (brake) range. This scheme of switching the shift range by electric control as described above is also called shift-by-wire scheme. In the D range, the B range and the R range, the driving force of drive device 100 is transmitted to wheel 300 and vehicle 1 runs. In the D range and the B range, vehicle 1 runs in the forward direction. The B range is a shift range in which an engine brake is more effective than in the D range. In the R range, vehicle 1 runs in the backward direction. In the description below, the D range, the B range and the R range are also collectively referred to as "drive range." On the other hand, in the N range, the driving force of drive device 100 is not transmitted to wheel 300. In the P range, the parking gear in transmission device 200 is actuated, output shaft 210 is fixed and rotation of wheel 300 is inhibited. In the description below, the N range and the P range are also collectively referred to as "non-drive range."

ECB 400 generates the brake hydraulic pressure in accordance with an amount of stroke of brake pedal 31, thereby causing the brake force to act on wheel 300.

IG switch 10 is a switch used by the driver to input requests for starting up and stopping a drive system of vehicle 1 (electrical equipment required to control running of vehicle 1). Positions to which IG switch 10 is operated include the IG-OFF position for bringing the drive system into the stop state (Ready-OFF state), the IG-ON position for applying electric power to the drive system, the start position for bringing the drive system into the startup state (Ready-ON state), and the like.

Accelerator position sensor 20 detects a position (accelerator position) AP of accelerator pedal 21. Brake stroke sensor 30 detects an amount of operation (brake stroke) BS of brake pedal 31. Steering angle sensor 40 detects a steering angle of steering 41. Vehicle speed sensor 50 detects a vehicle speed V based on the rotation speed of output shaft 210 of transmission device 200. Hydraulic pressure sensor 60 detects a brake hydraulic pressure generated by ECB 400. Acceleration sensor 70 detects an acceleration a (value that allows determination of the movement direction of vehicle 1) of vehicle 1. Seat load sensor 71 detects a load of the driver's seat, thereby detecting that the driver is seated in the driver's seat. Monitoring camera 72 takes a picture of the inside of the vehicle and monitors whether or not the driver is in the vehicle. Sound recognition device 73 emits a sound to ask the driver or recognizes a sound emitted by the driver. Notification device 74 notifies the driver of various information about vehicle 1 using images and sounds.

Shift sensor 80 is mechanically connected by a push-pull cable 92 to shift lever 91 operated along shift gate 93. Shift sensor 80 outputs, to ECU 800, a shift signal corresponding to a position of shift lever 91 (hereinafter also referred to as "shift position"). The shift signal is used by ECU 800 to determine the shift range requested by the driver (hereinafter also referred to as "requested range"). The shift signal includes a plurality of types of signals corresponding to the shift positions (described below). It is to be noted that shift sensor 80 may be provided near transmission device 200.

ECU 800 has a not-shown CPU (Central Processing Unit) and a not-shown memory built thereinto and executes a predetermined operation based on information stored in the memory and information provided from each sensor. Based on a result of the operation, ECU 800 controls the equipment mounted on vehicle 1.

Figure 2:
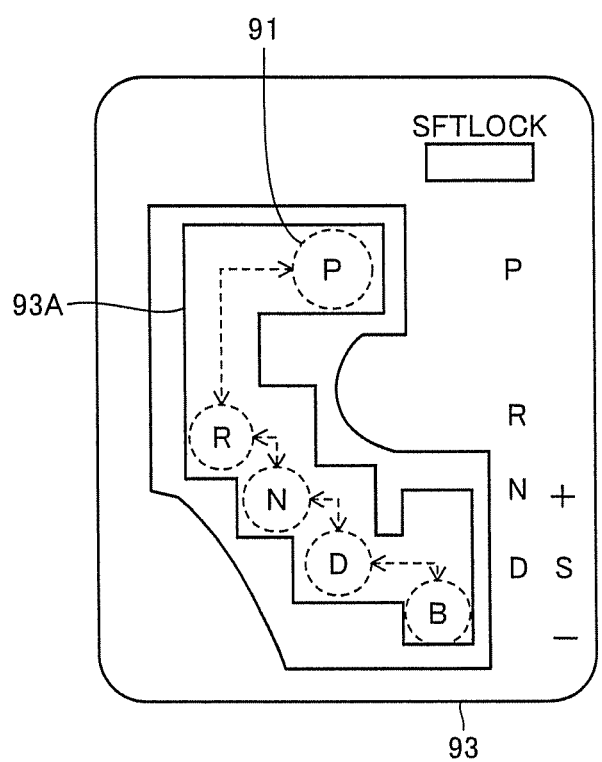
FIG. 2 shows a shift gate.

FIG. 2 shows shift gate 93. As shown in FIG. 2, shift gate 93 has a groove 93A for restricting a movement path of shift lever 91. Shift lever 91 is moved along this groove 93A from the P position side to the P, R, N, D, and B positions in this order.

Figure 3:
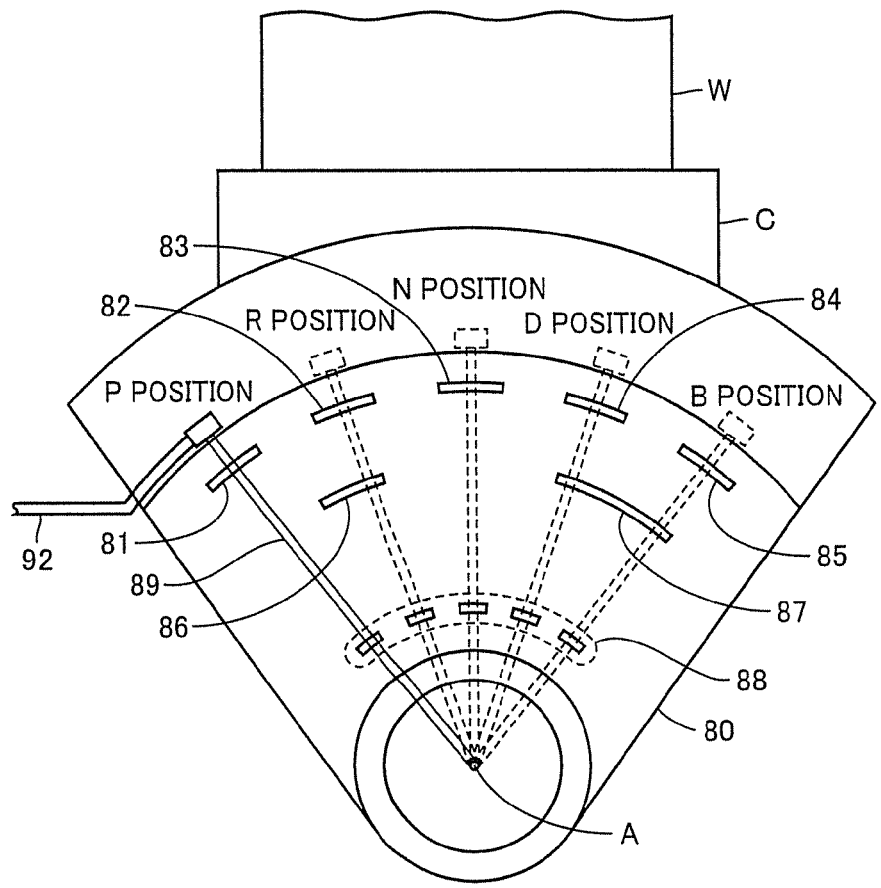
FIG. 3 schematically shows a structure of a shift sensor.

FIG. 3 schematically shows a structure of shift sensor 80. Shift sensor 80 includes first to eighth sensors 81 to 88, a movable lever 89, and a shift connector C. Shift connector C is connected to ECU 800 by a shift wire W.

Movable lever 89 has one end connected to shift lever 91 by push-pull cable 92, and the other end pivotablly connected to a pivot shaft A. Push-pull cable 92 is pushed or pulled in accordance with the shift operation by the driver, and thereby movable lever 89 is pivoted around pivot shaft A to a position corresponding to a shift position.

When movable lever 89 is in a range corresponding to the P position, the R position, the N position, the D position, or the B position, first sensor 81, second sensor 82, third sensor 83, fourth sensor 84, or fifth sensor 85 comes into contact with movable lever 89 and outputs a P signal, an R signal, an N signal, a D signal, or a B signal to ECU 800, respectively.

When movable lever 89 is in a range corresponding to the R position, sixth sensor 86 comes into contact with movable lever 89 and outputs an RV signal to ECU 800. When movable lever 89 is in a range corresponding to the D position and the B position, seventh sensor 87 comes into contact with movable lever 89 and outputs an FD (forward) signal to ECU 800. When movable lever 89 is in a range corresponding to the P, R, N, D, and B positions, eighth sensor 88 comes into contact with movable lever 89 and outputs an MJ signal to ECU 800.

Figure 4:
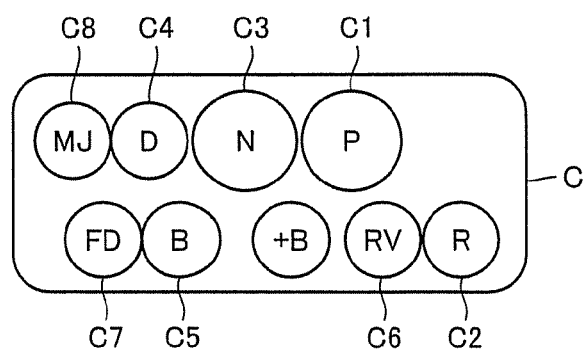
FIG. 4 shows a cross-sectional shape of a shift connector.

FIG. 4 shows a cross-sectional shape of shift connector C. Shift connector C includes connectors C1 to C8 for outputting the P signal, the R signal, the N signal, the D signal, the B signal, the RV signal, the FD signal, and the MJ signal, respectively. The respective signals outputted from these connectors C1 to C8 are inputted to ECU 800 through shift wire W.

FIG. 5 shows a correspondence relationship between shift position and combination of shift signals (hereinafter also referred to as "shift pattern") when shift sensor 80 is normal. In FIG. 5, a circle mark indicates that each of signals from P to MJ is detected. When the P signal and the MJ signal are detected, ECU 800 recognizes the shift pattern as the P pattern (i.e., recognizes the requested range as the P range). When the R signal, the RV signal and the MJ signal are detected, ECU 800 recognizes the shift pattern as the R pattern (i.e., recognizes the requested range as the R range). The same is applied as well to the method for recognizing the N range and the subsequent ranges. In this manner, ECU 800 recognizes the requested range in accordance with the shift pattern. Then, ECU 800 controls transmission device 200 such that the requested range that has been recognized matches actual shift range.

In vehicle 1 having the above-mentioned configuration, when an abnormality that the shift pattern does not correspond to any of the normal patterns shown in FIG. 5 (hereinafter also referred to as "shift pattern abnormality") occurs while the driver is driving vehicle 1, ECU 800 cannot recognize the requested range.

FIG. 6 shows a correspondence relationship between shift position and shift pattern when shift sensor 80 is abnormal (at the time of occurrence of a D-ON failure in which the D signal is constantly ON). When the D-ON failure occurs, the D signal is detected at all shift positions. Therefore, when the shift position is the D position, the D signal, the FD signal and the MJ signal are detected and the shift pattern matches the D pattern. However, when the shift position is the N position or the P position (position corresponding to the non-drive range), the shift pattern does not correspond to any of the normal patterns shown in FIG. 5. When such a shift pattern abnormality occurs, ECU 800 stops the driving force of vehicle 1 and prohibits switching to the drive range.

In the conventional art, after the shift pattern abnormality occurs, recovery of the driving force is prohibited and switching to the drive range is also prohibited until the shift pattern corresponding to the non-drive range (the P pattern or the N pattern) is normally recognized, even if the shift pattern corresponding to the drive range (the D pattern, the B pattern or the R pattern) is normally recognized. A reason for this is to prevent the vehicle from running against the user's intention.

In order to solve the above-mentioned conventional problem, even after occurrence of the shift pattern abnormality is determined, ECU 800 according to the present embodiment definitely determines that the drive range indicated by the shift pattern is the requested range and recovers the driving force, when the shift pattern changes into the normal pattern of the drive range and the driver's intention to cause the vehicle to run can be confirmed. This is the most characteristic point in the present embodiment.

Figure 7:
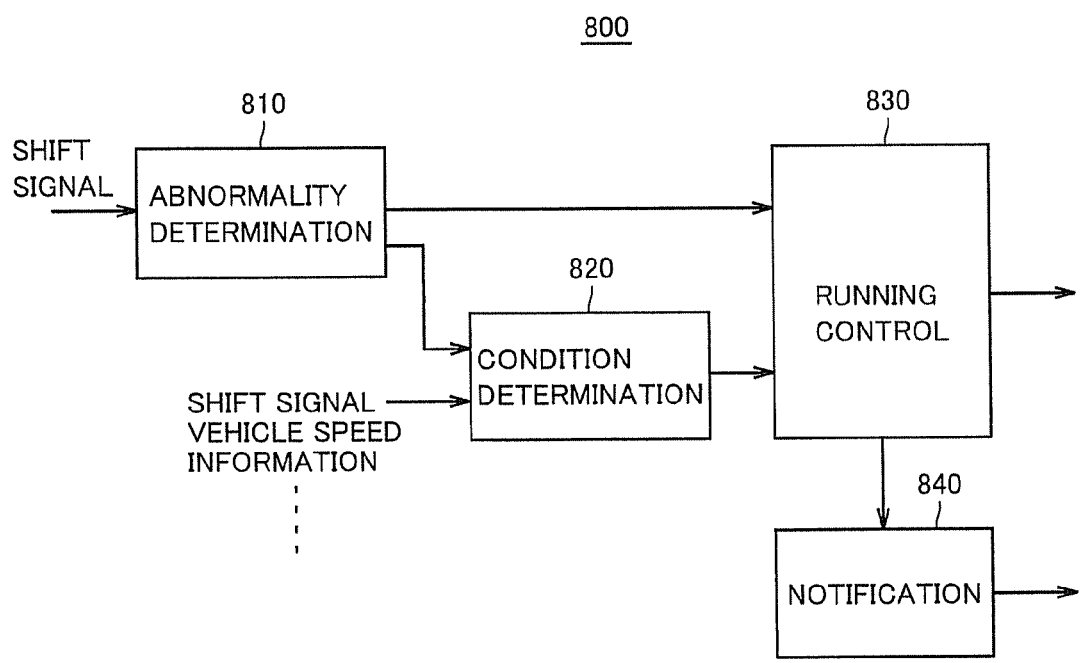
FIG. 7 is a functional block diagram (No. 1) of an ECU.

FIG. 7 is a functional block diagram of ECU 800. Each functional block shown in FIG. 7 may be implemented by hardware, or may be implemented by software.

ECU 800 includes an abnormality determination unit 810, a condition determination unit 820, a running control unit 830, and a notification unit 840.

Abnormality determination unit 810 determines whether or not the above-mentioned shift pattern abnormality is occurring, based on the shift signal.

After occurrence of the shift pattern abnormality is determined, condition determination unit 820 determines whether or not a first condition that the shift pattern has changed into the normal pattern of the drive range is satisfied as well as whether or not a second condition that the driver has an intention to cause the vehicle to run is satisfied. If vehicle 1 is running (if vehicle speed V is in excess of a threshold value), condition determination unit 820 determines that the driver is in the vehicle and has an intention to cause the vehicle to run.

When occurrence of the shift pattern abnormality is determined, running control unit 830 stops actuation of drive device 100 to stop generation of the driving force, and prohibits switching to the drive range. When condition determination unit 820 determines that the above-mentioned first condition and second condition are satisfied after occurrence of the shift pattern abnormality is determined, running control unit 830 definitely determines that the drive range indicated by the shift pattern is the requested range, switches the shift range to that drive range, and actuates drive device 100 again to recover the driving force. As a result, vehicle 1 can run in the failsafe mode.

Running control unit 830 also calculates requested driving force corresponding to accelerator position AP, and executes a process (smoothing process) of causing actual driving force to follow the requested driving force using a time constant. The time constant is a value corresponding to a time that elapses before the actual driving force reaches the requested driving force. Therefore, as the time constant becomes larger, the speed at which the actual driving force is caused to follow the requested driving force becomes slower. When recovering the driving force after the shift pattern abnormality occurs, running control unit 830 changes the time constant used in the smoothing process into a value larger than that in the normal time for a certain time period. In other words, for a certain time period after recovery of the driving force, running control unit 830 causes the actual driving force to follow the requested driving force at a speed slower than that in the normal time.

When running control unit 830 recovers the driving force after the shift pattern abnormality occurs, notification unit 840 notifies the driver of the recovery using notification device 74.

Figure 8:
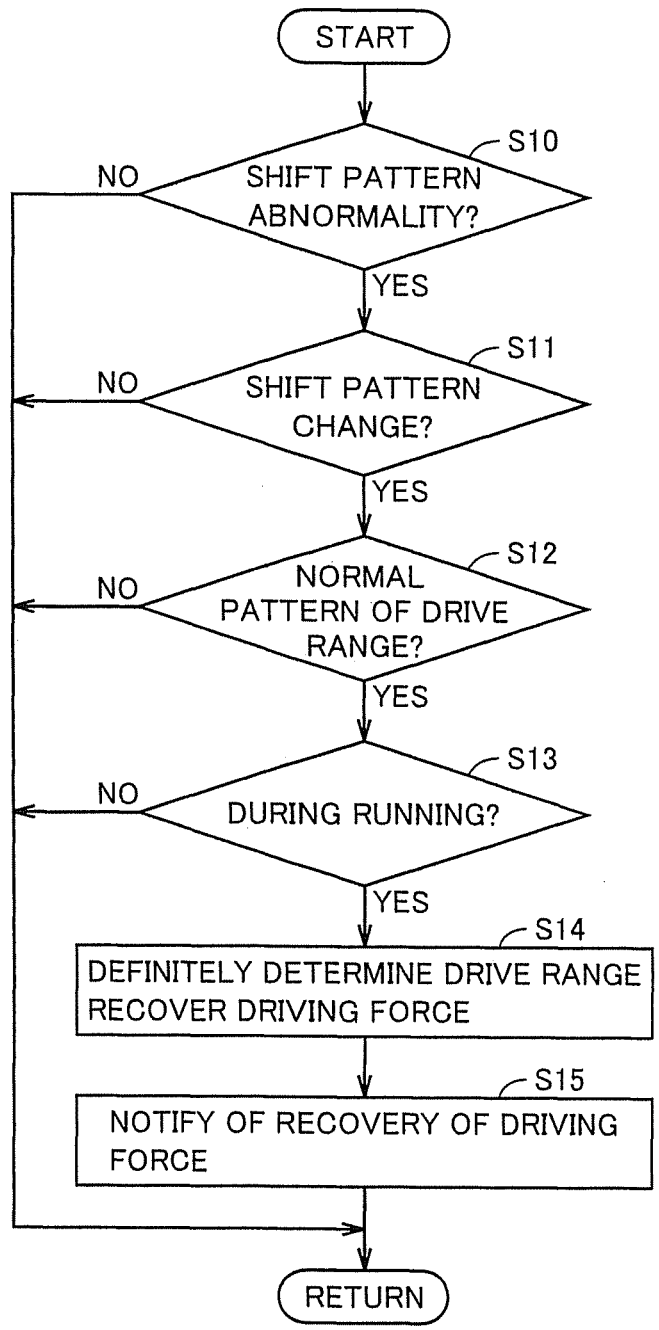
FIG. 8 is a flowchart (No. 1) showing a process procedure by the ECU.

FIG. 8 is a flowchart showing a process procedure by ECU 800 for implementing the above-mentioned functions. The flowchart in FIG. 8 is repeatedly executed at a predetermined cycle during actuation of the drive system of vehicle 1.

In step (hereinafter the step is abbreviated as "S") 10, ECU 800 determines whether or not there is a shift pattern abnormality. If there is no shift pattern abnormality (NO in S10), ECU 800 ends the process and performs normal control. If there is a shift pattern abnormality (YES in S10), ECU 800 stops the driving force as described above and the process proceeds to S11.

In S11, ECU 800 determines whether or not the shift pattern has changed. If the shift pattern has changed (YES in S11), the process proceeds to S12 and ECU 800 determines whether or not the changed shift pattern matches the normal pattern of the drive range.

If the changed shift pattern matches the normal pattern of the drive range (YES in S12), the process proceeds to S13 and ECU 800 determines whether or not the vehicle is running.

If the vehicle is running (YES in S13), the process proceeds to S14 and ECU 800 definitely determines that the drive range indicated by the changed shift pattern is the requested range, switches the shift range to the definitely determined drive range, and recovers the driving force. As a result, the vehicle can run in the failsafe mode. Thereafter, in S15, ECU 800 notifies the driver of recovery of the driving force.

If the shift pattern does not change (NO in S11), if the changed shift pattern does not match the normal pattern of the drive range (NO in S12), or if the vehicle is not running (NO in S13), ECU 800 ends the process without recovering the driving force.

Figure 9:
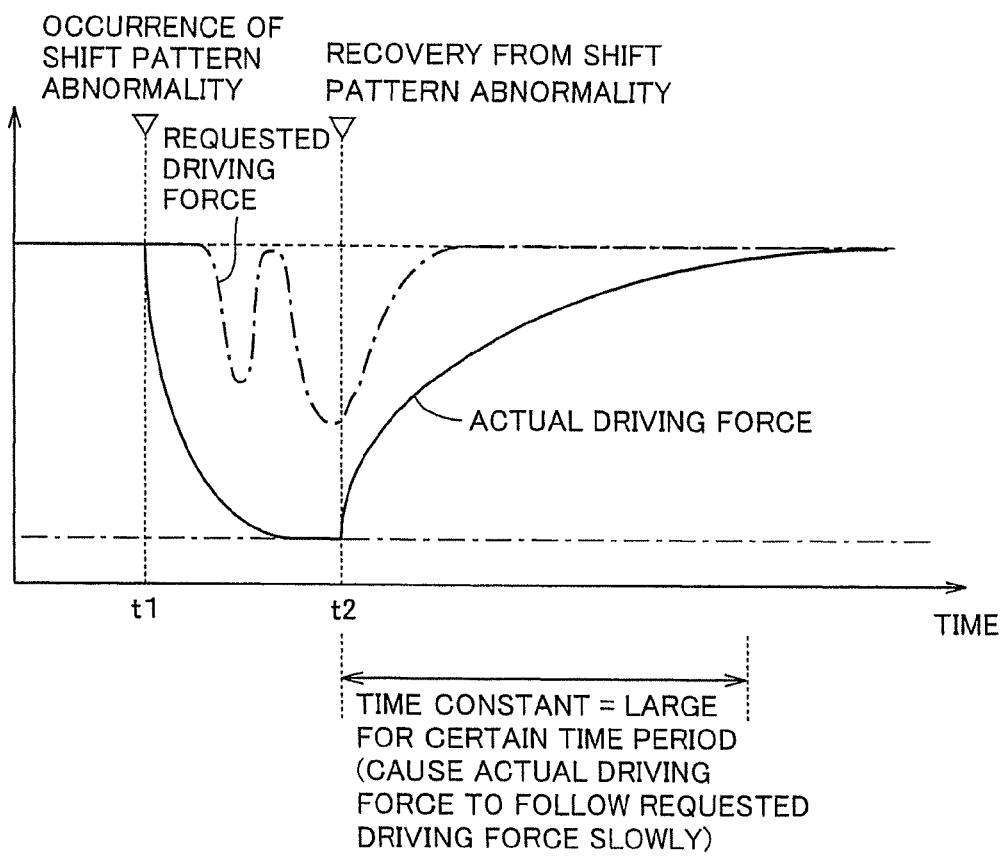
FIG. 9 shows a relationship between requested driving force and actual driving force when driving force is recovered after a shift pattern abnormality occurs.

FIG. 9 shows a relationship between the requested driving force and the actual driving force when the driving force is recovered after the shift pattern abnormality occurs. When the shift pattern abnormality occurs at time t1, ECU 800 reduces the actual driving force. Thereafter, when the driver changes accelerator position AP, the requested driving force also changes in response to the change in accelerator position AP. The actual driving force is, however, maintained at a reduced state regardless of the change in the requested driving force.

When it is determined at time t2 that the shift pattern changes and matches the normal pattern of the drive range and the vehicle is running, the driving force is recovered. On this occasion, even though the actual driving force is expected to deviate from the requested driving force, a sudden increase in the actual driving force is suppressed by the above-mentioned smoothing process. Furthermore, for a certain time period after t2, the time constant used in the smoothing process is changed into a value larger than that in the normal time. As a result, the actual driving force is caused to follow the requested driving force at a speed slower than that in the normal time. Therefore, a sudden increase in the actual driving force can be suppressed more appropriately.

As described above, even after occurrence of the shift pattern abnormality is determined, ECU 800 according to the present embodiment recovers the driving force and permits switching to the drive range, when the shift pattern changes into the normal pattern of the drive range and the vehicle is running (when the driver's intention to cause the vehicle to run can be confirmed). As a result, even after occurrence of the shift pattern abnormality is determined, vehicle 1 can run in the failsafe mode appropriately.

In the present embodiment, a description has been given to the case where the drive system itself of vehicle 1 is still maintained at the actuated state after occurrence of the shift pattern abnormality is determined. However, in a vehicle whose drive system is stopped when occurrence of the shift pattern abnormality is determined, for example, the drive system may be started up again after occurrence of the shift pattern abnormality is determined and when the shift pattern changes into the normal pattern of the drive range and the vehicle is running.

Second Embodiment

In the first embodiment, the condition that the shift pattern changes into the normal pattern of the drive range and the vehicle is running is used as the condition for recovering the driving force after the shift pattern abnormality occurs.

In contrast, in a second embodiment, a condition that a direction in which the vehicle can run in the drive range indicated by the changed shift pattern matches a movement direction of the vehicle is added as the condition for recovering the driving force, in addition to the condition described in the first embodiment. The remaining structure, function and process are the same as those in the above-mentioned first embodiment, and thus, detailed description thereof will not be repeated here.

Figure 10:
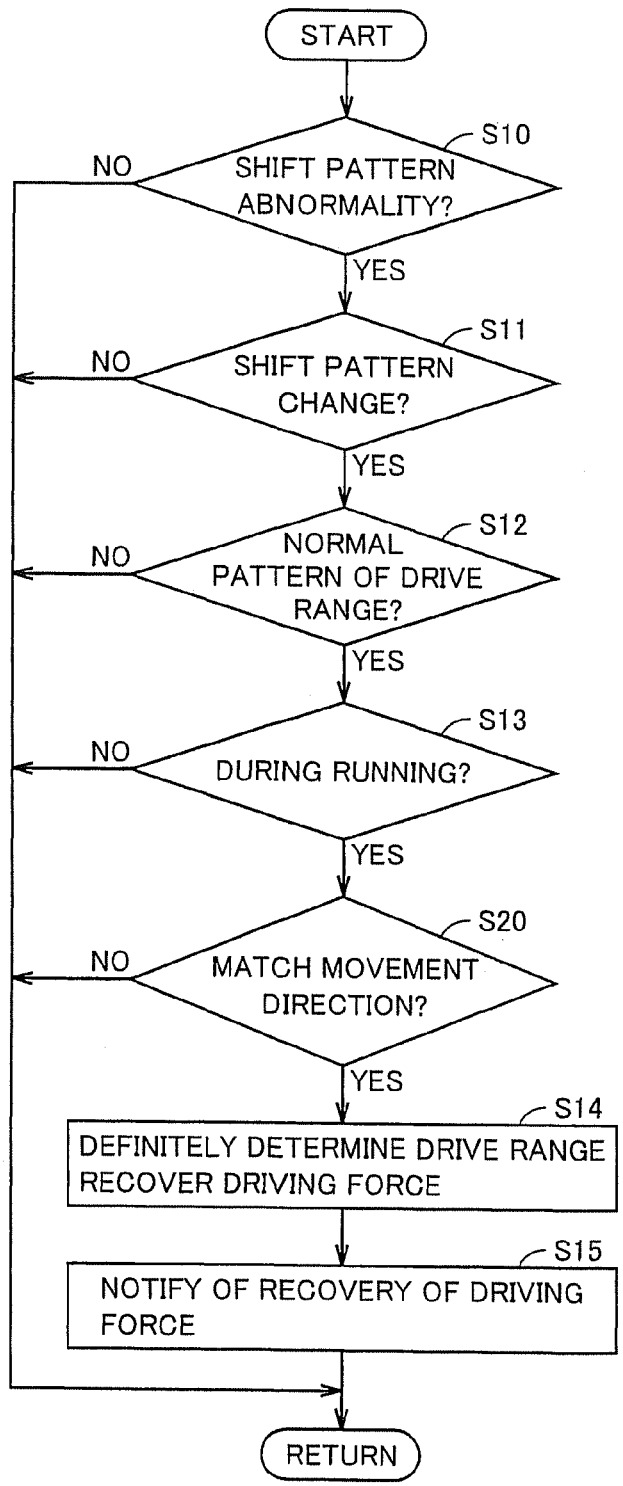
FIG. 10 is a flowchart (No. 2) showing a process procedure by the ECU.

FIG. 10 is a flowchart showing a process procedure by ECU 800 according to the second embodiment. The flowchart shown in FIG. 10 is different from the flowchart shown in above-mentioned FIG. 8 in that a process in S20 is added between S13 and S14. The remaining processes are the same and the same step numbers are given. Therefore, detailed description on them will not be repeated here.

If it is determined in S13 that the vehicle is running, ECU 800 determines in S20 whether or not the direction in which vehicle 1 can run in the drive range indicated by the changed shift pattern (the forward direction in the case of the D range or the B range, and the backward direction in the case of the R range) matches the movement direction of vehicle 1. It is to be noted that the movement direction of vehicle 1 can be determined based on, for example, a result of detection by acceleration sensor 70. The movement direction of vehicle 1 may also be determined by learning a correspondence relationship between a result of detection by acceleration sensor 70 and a result of detection by vehicle speed sensor 50. Alternatively, in a vehicle including a motor serving as drive device 100 and a resolver capable of detecting a rotation direction of the motor, the movement direction of vehicle 1 may be determined based on a result of detection by the resolver.

If it is determined that the direction in which vehicle 1 can run in the drive range indicated by the changed shift pattern matches the movement direction of vehicle 1 (YES in S20), the process proceeds to S14 and the subsequent steps, and ECU 800 definitely determines that the drive range indicated by the shift pattern is the requested range and recovers the driving force.

As described above, in ECU 800 according to the second embodiment, the condition that the direction in which the vehicle can run in the drive range indicated by the changed shift pattern matches the movement direction of the vehicle is added as the condition for recovering the driving force after the shift pattern abnormality occurs, in addition to the condition that the shift pattern changes into the normal pattern of the drive range and the vehicle is running. Therefore, a shock can be suppressed, which is caused by formation of the drive range in a direction different from the movement direction of the vehicle when the driving force is recovered.

Third Embodiment

In the first embodiment, the condition that the shift pattern changes into the normal pattern of the drive range and the vehicle is running is used as the condition for recovering the driving force after the shift pattern abnormality occurs.

In contrast, in a second embodiment, a condition that the accelerator is OFF is added as the condition for recovering the driving force, in addition to the condition described in the first embodiment. The remaining structure, function and process are the same as those in the above-mentioned first embodiment, and thus, detailed description thereof will not be repeated here.

Figure 11:
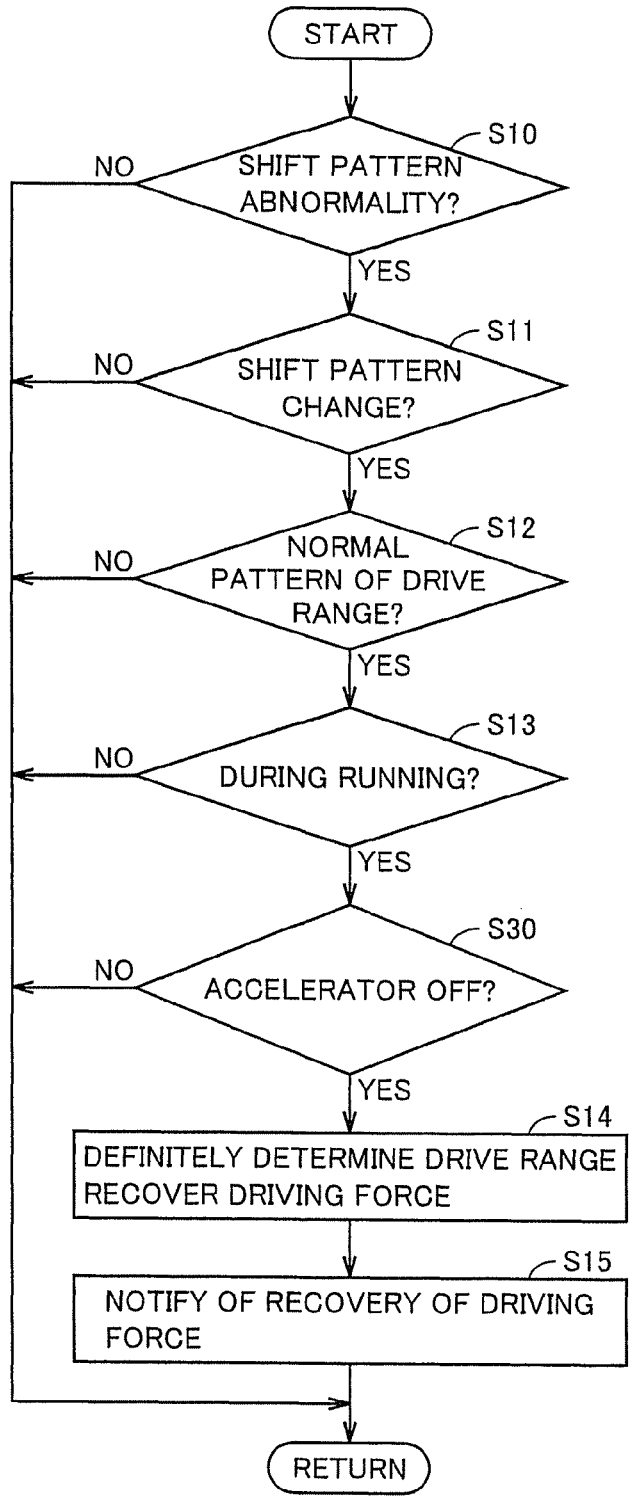
FIG. 11 is a flowchart (No. 3) showing a process procedure by the ECU.

FIG. 11 is a flowchart showing a process procedure by ECU 800 according to the third embodiment. The flowchart shown in FIG. 11 is different from the flowchart shown in above-mentioned FIG. 8 in that a process in S30 is added between S13 and S14. The remaining processes are the same and the same step numbers are given. Therefore, detailed description on them will not be repeated here.

If it is determined in S13 that the vehicle is running, ECU 800 determines in S30 whether or not the accelerator is OFF, based on accelerator position AP. The state in which the accelerator is OFF refers to a state in which an amount of operation of accelerator pedal 21 is equal to or smaller than a predetermined threshold value.

If it is determined that the accelerator is OFF (YES in S30), the process proceeds to S14 and the subsequent steps, and ECU 800 definitely determines that the drive range indicated by the shift pattern is the requested range and recovers the driving force.

As described above, in ECU 800 according to the third embodiment, the condition that the accelerator is OFF is added as the condition for recovering the driving force after the shift pattern abnormality occurs, in addition to the condition that the shift pattern changes into the normal pattern of the drive range and the vehicle is running. Therefore, an influence of recovery of the driving force is relatively smaller while the vehicle is running than that while the vehicle is in park, and the driving force can be reliably recovered in accordance with the driver's intention.

Fourth Embodiment

In the first embodiment, the driver's intention to cause the vehicle to run is indirectly confirmed based on whether or not the vehicle is running.

In contrast, in a fourth embodiment, the driver's intention to cause the vehicle to run is directly confirmed based on information provided from the equipment capable of directly checking whether or not the driver is in the vehicle, such as steering angle sensor 40, seat load sensor 71, monitoring camera 72, and sound recognition device 73. The remaining structure, function and process are the same as those in the above-mentioned first embodiment, and thus, detailed description thereof will not be repeated here.

Figure 12:
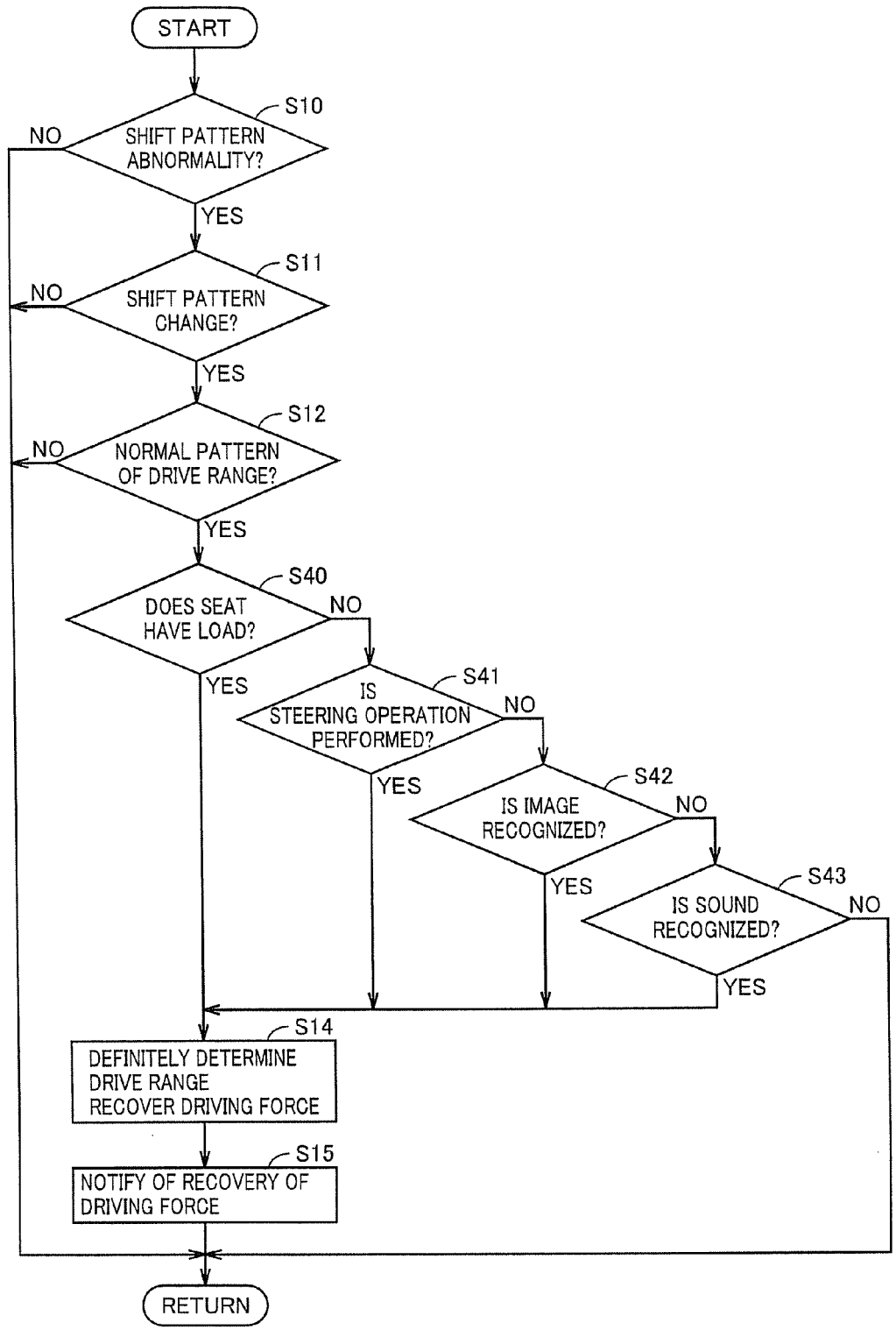
FIG. 12 is a flowchart (No. 4) showing a process procedure by the ECU.

FIG. 12 is a flowchart showing a process procedure by ECU 800 according to the fourth embodiment. The flowchart shown in FIG. 12 is different from the flowchart shown in above-mentioned FIG. 8 in that processes in S40 to S43 in FIG. 12 are added instead of the process in S13 in FIG. 8. The remaining processes are the same and the same step numbers are given. Therefore, detailed description on them will not be repeated here.

If the changed shift pattern matches the normal pattern of the drive range (YES in S12), ECU 800 determines in the processes in S40 to S43 whether or not the driver is in the vehicle, based on information provided from seat load sensor 71, steering angle sensor 40, monitoring camera 72, and sound recognition device 73.

Specifically, if the driver's seat has a load (YES in S40), if operation of steering 41 is performed (YES in S41), if an image of the driver is recognized (YES in S42), or if a sound emitted by the driver is recognized (YES in S43), ECU 800 determines that the driver is in the vehicle and has an intention to cause the vehicle to run. For example, in the process in S43, using sound recognition device 73 to make an inquiry by sounds about whether or not the driver has an intention to cause the vehicle to run, it may be determined whether or not a response to the inquiry that the driver has an intention to cause the vehicle to run can be recognized by sounds.

If it is determined in at least one of the processes in S40 to S43 that the driver has an intention to cause the vehicle to run, the process proceeds to S14 and the subsequent steps, and ECU 800 definitely determines that the drive range indicated by the shift pattern is the requested range and recovers the driving force.

As described above, when the shift pattern changes into the normal pattern of the drive range and it can be directly confirmed that the driver is in the vehicle, ECU 800 according to the fourth embodiment definitely determines that the drive range indicated by the shift pattern is the requested range and recovers the driving force. As a result, the driving force can be recovered more reliably, with the driver being in the vehicle.

It is to be noted that two or more of the above-mentioned first to fourth embodiments may be combined.

It should be understood that the embodiments disclosed herein are illustrative and not limitative in any respect. The scope of the present invention is defined by the teems of the claims, rather than the description above, and is intended to include any modifications within the scope and meaning equivalent to the terms of the claims.

REFERENCE SIGNS LIST 1 vehicle; 10 IG switch; 20 accelerator position sensor; 21 accelerator pedal; 30 brake stroke sensor; 31 brake pedal; 40 steering angle sensor; 41 steering; 50 vehicle speed sensor; 60 hydraulic pressure sensor; 70 acceleration sensor; 71 seat load sensor; 72 monitoring camera; 73 sound recognition device; 74 notification device; 80 shift sensor; 81 to 88 first to eighth sensors; 89 movable lever; 91 shift lever; 92 push-pull cable; 93 shift gate; 93A groove; 100 drive device; 200 transmission device; 210 output shaft; 300 wheel; 400 ECB; 800 ECU; 810 abnormality determination unit; 820 condition determination unit; 830 running control unit; 840 notification unit

The invention claimed is:

1. A control device for a vehicle in which a shift range is switched in accordance with a shift signal outputted from a sensor detecting shift operation by a driver, said shift range including a drive range for causing said vehicle to run, said control device comprising:

an abnormality determination unit that determines whether or not said shift signal is abnormal; and a running control unit that, when it is determined that said shift signal is abnormal, determines whether or not a predetermined condition, which includes a first condition that said shift signal changes into a state in which said shift signal normally indicates said drive range and a second condition that the driver has an intention to cause said vehicle to run, is satisfied, after it is determined that said shift signal is abnormal, and when said predetermined condition is satisfied, permits running or startup of said vehicle in said drive range indicated by said shift signal, wherein when it is determined that said shift signal is abnormal, said running control unit stops driving force of said vehicle until said predetermined condition is satisfied, and when said predetermined condition is satisfied, said running control unit sets said shift range to said drive range indicated by said shift signal and recovers the driving force of said vehicle, when said shift signal is normal, said running control unit causes said driving force to follow requested driving force at a first speed, and when recovering said driving force after it is determined that said shift signal is abnormal and for a predetermined amount of time until full recovery, said running control unit causes said driving force to follow said requested driving force at a second speed slower than said first speed for a certain time period.

2. The control device for a vehicle according to claim 1, wherein
when it is detected that said vehicle is running, said running control unit determines that said second condition is satisfied.

3. The control device for a vehicle according to claim 1, wherein
when it is detected that the driver is in said vehicle, said running control unit determines that said second condition is satisfied.

4. The control device for a vehicle according to claim 1, wherein
in addition to said first and second conditions, said predetermined condition includes a third condition that a direction in which said vehicle can run in said drive range indicated by said shift signal matches a movement direction of said vehicle.

5. The control device for a vehicle according to claim 1, wherein
in addition to said first and second conditions, said predetermined condition includes a third condition that an amount of operation of an accelerator pedal by said driver is equal to or smaller than a threshold value.

6. The control device for a vehicle according to claim 1, further comprising
a notification unit that notifies the driver of recovery of said driving force.

7. The control device for a vehicle according to claim 1, wherein
there are a plurality of said shift ranges,
said sensor is configured to output a plurality of predetermined combinations of shift signals corresponding to the plurality of said shift ranges, and
when a combination of said shift signals does not correspond to any of said plurality of predetermined combinations, said abnormality determination unit determines that said shift signal is abnormal.

* * * * *